United States Patent [19]

Puppin

[11] Patent Number: 5,882,564
[45] Date of Patent: Mar. 16, 1999

[54] RESIN AND WOOD FIBER COMPOSITE PROFILE EXTRUSION METHOD

[75] Inventor: Giuseppe Puppin, Bayport, Minn.

[73] Assignee: Andersen Corporation, Bayport, Minn.

[21] Appl. No.: 669,591

[22] Filed: Jun. 24, 1996

[51] Int. Cl.⁶ .................................................. B29C 47/12
[52] U.S. Cl. .............. 264/177.16; 264/101; 264/211.21; 264/211.23; 264/331.15; 528/502 R; 528/503; 524/35; 524/567
[58] Field of Search .............................. 264/101, 177.16, 264/570, 571, 572, 211.21, 211.23, 122; 528/502 R, 503; 524/35, 567

[56] References Cited

U.S. PATENT DOCUMENTS

| | | | |
|---|---|---|---|
| Re. 32,772 | 10/1988 | Hawley | 264/108 |
| 2,538,628 | 1/1951 | Pendleton | 68/43 |
| 2,973,783 | 3/1961 | Boe | 138/55 |
| 3,256,560 | 6/1966 | Adomaitis | 18/12 |
| 3,651,187 | 3/1972 | Cessna, Jr. | 264/108 |
| 3,674,388 | 7/1972 | Heilmayr et al. | 425/72 |
| 3,886,705 | 6/1975 | Cornland | 52/586 |
| 3,976,733 | 8/1976 | Havens | 264/89 |
| 3,993,726 | 11/1976 | Moyer | 264/174 |
| 4,056,591 | 11/1977 | Goettler et al. | 264/108 |
| 4,057,610 | 11/1977 | Goettler et al. | 264/108 |
| 4,150,932 | 4/1979 | Moghe | 425/197 |
| 4,164,388 | 8/1979 | Inman et al. | 425/378 |
| 4,226,580 | 10/1980 | Lupke et al. | 425/504 |
| 4,240,782 | 12/1980 | McPhee et al. | 425/467 |
| 4,271,103 | 6/1981 | McAlister | 264/1 |
| 4,272,557 | 6/1981 | Lyng | 428/112 |
| 4,305,901 | 12/1981 | Prince et al. | 264/176 R |
| 4,312,917 | 1/1982 | Hawley | 428/375 |
| 4,361,612 | 11/1982 | Shaner et al. | 428/106 |
| 4,376,144 | 3/1983 | Goettler | 428/36 |
| 4,393,020 | 7/1983 | Li et al. | 264/108 |
| 4,414,267 | 11/1983 | Coran et al. | 428/288 |
| 4,450,131 | 5/1984 | Martinek | 264/209 |
| 4,518,343 | 5/1985 | Seiffert | 425/466 |
| 4,588,538 | 5/1986 | Chung et al. | 264/29.2 |
| 4,600,461 | 7/1986 | Guy | 156/244.12 |
| 4,609,515 | 9/1986 | Smyth | 264/174 |
| 4,626,397 | 12/1986 | Bose | 264/565 |
| 4,627,472 | 12/1986 | Goettler et al. | 138/174 |
| 4,672,006 | 6/1987 | McGraw | 428/528 |
| 4,728,387 | 3/1988 | Hilakos | 156/441 |
| 4,764,102 | 8/1988 | Takahashi | 425/466 |
| 4,776,391 | 10/1988 | Warner | 165/111 |
| 4,786,353 | 11/1988 | Templeton et al. | 156/359 |
| 4,788,088 | 11/1988 | Kohl | 428/34.5 |
| 4,828,770 | 5/1989 | Fabian et al. | 264/40.3 |
| 4,864,964 | 9/1989 | Hilakos | 118/117 |
| 4,883,622 | 11/1989 | Dealy et al. | 264/108 |
| 4,883,625 | 11/1989 | Glemet et al. | 264/136 |
| 4,900,499 | 2/1990 | Mills | 264/257 |
| 4,906,171 | 3/1990 | Miller | 425/131.1 |
| 4,927,581 | 5/1990 | Medwin | 264/108 |
| 4,929,503 | 5/1990 | Shirasaki et al. | 428/373 |
| 4,937,035 | 6/1990 | Richter | 264/515 |
| 5,035,848 | 7/1991 | Bush | 264/174 |
| 5,059,371 | 10/1991 | Saheki et al. | 264/108 |
| 5,069,853 | 12/1991 | Miller | 264/176.1 |
| 5,082,605 | 1/1992 | Brooks et al. | 264/40.6 |
| 5,096,406 | 3/1992 | Brooks et al. | 425/205 |
| 5,112,546 | 5/1992 | Comfort | 264/167 |
| 5,160,466 | 11/1992 | Allan et al. | 264/69 |
| 5,227,105 | 7/1993 | Eucker et al. | 264/57 |
| 5,246,647 | 9/1993 | Beck et al. | 264/41 |
| 5,264,261 | 11/1993 | Bush | 428/36.4 |
| 5,273,819 | 12/1993 | Jex | 428/297 |
| 5,277,566 | 1/1994 | Augustin et al. | 425/114 |
| 5,281,380 | 1/1994 | Umeda et al. | 264/108 |
| 5,307,843 | 5/1994 | Jarrin et al. | 138/174 |
| 5,342,469 | 8/1994 | Bodford et al. | 156/244.22 |
| 5,406,768 | 4/1995 | Puppin | 52/730.4 |
| 5,421,085 | 6/1995 | Muscato et al. | 29/890.1 |
| 5,441,801 | 8/1995 | Deaner et al. | 428/326 |
| 5,486,553 | 1/1996 | Deaner et al. | 524/13 |
| 5,497,594 | 3/1996 | Puppin | 52/730.4 |
| 5,518,677 | 5/1996 | Deaner et al. | 264/142 |

FOREIGN PATENT DOCUMENTS

| | | |
|---|---|---|
| 10 537 | 4/1980 | European Pat. Off. . |
| 0 586 213 A | 3/1994 | European Pat. Off. . |
| 0 610 619 A | 8/1994 | European Pat. Off. . |
| 1 356 429 | 2/1963 | France . |
| 16 53 263 A | 11/1971 | Germany . |
| 54-107961 | 8/1979 | Japan . |
| 1 480 219 A | 7/1977 | United Kingdom . |
| WO 95 13179 A | 5/1995 | WIPO . |

OTHER PUBLICATIONS

Patent Abstracts of Japan, vol. 004, No. 128 (M–031), 9 Sep. 1980 & JP 55 087535 A (Showa Denko KK), 2 Jul. 1980, see abstract.
International Search Report (PCT) dated Oct. 2, 1997.

*Primary Examiner*—Fred Teskin
*Attorney, Agent, or Firm*—Merchant, Gould, Smith, Edell, Welter & Schmidt, P.A.

[57] ABSTRACT

The invention relates to a method for forming a composition comprising a thermoplastic composite in the form of a linear profile extrudate. Such a profile comprises a structural member having improved tensile strength, flex modulus, impact resistance and other improved structural properties. The invention involves a unique extruder configuration having a change in direction for the resin and fiber that optimizes the composite strength by promoting the random orientation of the fibers resulting in improved structural properties. Further, because of the change in direction, the extruder can include a cooling feature that cools the profile interior as the profile leaves the exit die thus increasing the physical properties, productivity and quality of the product.

14 Claims, 6 Drawing Sheets

RESIN AND WOOD FIBER COMPOSITE PROFILE EXTRUSION METHOD

FIELD OF THE INVENTION

The invention relates to the manufacture of composite thermoplastic profiles used in the fabrication of structural members. Composite materials can be made from a matrix forming material such as a thermoplastic and a reinforcement for the matrix such as a fiber. The components can be added separately to the member forming process or combined to form a pre-prepared composite feed stock. Such members can comprise any structural unit or portion thereof. Preferably the member can be used in the manufacture of windows or doors for either residential or commercial architecture. More particularly, the invention relates to a method for using an improved composite material adapted to profile extrusion processing. The methods of the invention can be used to form structural members that have improved properties when used in windows and doors. The composite materials of the invention can be made to manufacture structural components such as rails, jambs, stiles, sills, tracks, stop and sash, non-structural trim elements such as grid cove, bead, quarter round, etc. The product of the invention comprises a profile which is an extruded composite material having a desirable structural shape with one or more substantially hollow interior spaces. While the interior may contain structural webs or supports, the profile is substantially hollow. The exterior of the profile can have a coextruded layer that provides either a smooth finish or a desirable colored appearance.

BACKGROUND OF THE INVENTION

Conventional window and door manufacturers have commonly used wood and metal components in forming structural members. Commonly, residential windows are manufactured from milled wood products or extruded aluminum parts that are assembled with glass to form typically double hung or casement units. Wood windows while structurally sound, useful and well adapted for use in many residential installations, can deteriorate under certain circumstances. Wood windows also require painting and other periodic maintenance. Wooden windows also suffer from cost problems related to the availability of suitable wood for construction. Clear wood products are slowly becoming more scarce and are becoming more expensive as demand increases. While metal components are often combined with glass and formed into single unit sliding windows, metal windows typically suffer from substantial energy loss during temperature extremes of heat or cold.

Extruded thermoplastic materials have also been used as non-structural components in window and door manufacture. Filled and unfilled thermoplastics have been extruded into useful seals, trim, weather-stripping, coatings and other window construction components. Thermoplastic materials such as polyvinyl chloride have been combined with wood members in manufacturing PERMASHIELD® brand windows manufactured by Andersen Corporation for many years. The technology disclosed in Zanini, U.S. Pat. Nos. 2,926,729 and 3,432,883, have been utilized in the manufacturing of plastic coverings or envelopes on wooden or other structural members. Generally, the cladding or coating technology used in making PERMASHIELD® windows involves extruding a separate thin polyvinyl chloride outer layer or envelope surrounding a wooden structural member.

Polyvinyl chloride has been combined with wood fiber to make extruded materials. Such materials have successfully been used in the form of a structural member that is a direct replacement for wood. These extruded materials have sufficient modulus, compressive strength, coefficient of thermal expansion to match wood to produce a direct replacement material. Typical composite materials have achieved a modulus greater than about 500,000 psi (preferably between 600,000 and 1,500,000 psi) acceptable COOT, tensile strength, compressive strength, etc. to be useful. Deaner et al., U.S. Pat. Nos. 5,406,768, 5,441,801, 5,486,553, 5,497, 594, 5,518,677, 5,539,027 and 5,695,874 and U.S. Ser. Nos. 08/543,959 (application pending, filed 17 Oct. 1995) and 08/587,828 (application abandoned) disclose a PVC/wood fiber composite that can be used as a high strength material in a structural member. This PVC/fiber composite has utility in many window and door applications.

A substantial and continuing need exists to provide a improved composite material that can be made of thermoplastic polymer and wood fiber. The composite can be made with an optional, intentional recycle of a waste stream. A further need exists for a composite material that can be extruded into a shape that is a direct substitute for the equivalent milled shape in a wooden or metal structural member. A thermoplastic with fiber compatibility, good thermal properties and good structural or mechanical properties is required. This need also requires a composite with a coefficient of thermal expansion that approximates wood, that can be extruded into reproducible stable dimensions, a high modulus, a high tensile strength, a high compressive strength, a low thermal transmission rate, an improved resistance to insect attack and rot while in use and a hardness and rigidity that permits sawing, milling, and fastening retention comparable to wood members. Still further need exists to optimize the structural properties of the material and to increase productivity without reducing composite structural properties.

BRIEF DISCUSSION OF THE INVENTION

We have found improved extrusion methods for making improved profile structural members. Such members can be manufactured from a thermoplastic and a fiber. Such materials can be separately added or a preferred composite feed can be used. Resin fiber composite is an excellent substitute for wood and metal structural members in the articles of the invention.

We have found that a large variety of engineering resins and fibers can be used in the methods of the invention. Useful engineering resins are available in a variety of grades, molecular weights, melting points, formulations, melt indices, etc. Further, we have also found that a variety of fibers can be used in the invention, however, a fiber having specific dimensions and aspect ratios are preferred. We have found that not every engineering resin is useful in the manufacturing of the resin fiber composites. The engineering resin must be compatible in the melt form of wood fiber to form a high strength composite. The fiber must be fully wetted and incorporated in the thermoplastic matrix to form a high strength composite material. Further, the engineering resin must have a thermal property (melt flow properties or melting point greater than 200° C.) that permits successful composite manufacture. Lastly, the resin should provide sufficient structural properties to the composite in conjunction with the fiber to be successful in structural members in window and door manufacture for residential and institutional architecture. We have found that in methods of manufacturing the resin/fiber composite that a wholly random isotropic distribution of fiber optimizes structural properties in the profile. We have found that the isotropic nature orientation of the fiber can be obtained if the extrusion path or the melt flow of the thermoplastic composite includes at least one change in direction greater than 75°. Such a change in direction should be followed by a long continuous linear path for the composite. Such a linear path can re-orient the fiber removing the random orientation. In this regard, the distance from the change in direction to the die exit should be less than a certain dimension depending on fiber character. Generally, for commonly used thermoplastic materials and commonly available reinforcing fibers, the dimension between the change in direction to the exit die should be less than 10 centimeters. This dimension depends on the fiber length, the fiber concentration in the composite, the wall thickness (cross-section) of the profile.

The distance from the change in direction to the exit die also known as the length of the profile die depends on fiber length and fiber concentration. Longer fibers (e.g., 5–10 millimeters in length) are more slowly reoriented by passage through the die than relatively shorter fibers (e.g., 0.1 millimeter to 1 millimeter). Accordingly, as the fiber length decreases from about 10 millimeters to less than 2 millimeters, the exit die length should become appropriately shorter. Additionally, as the concentration of fiber increases, the length of the exit die can increase without substantially reorientation of the fiber. Low concentrations of fiber tend to be reoriented in the exit die rapidly while high concentrations of fiber take proportionately longer.

Similarly, as the amount of material moving through the die which can also be viewed as the wall thickness or cross-sectional area of the profile increases, the tendency to reorient in the exit die is decreased. Accordingly, thick walls, substantial through put of material and large cross-sectional areas tend to reduce die reorientation. The exit die can be proportionately longer as the amount of material, the wall thickness or cross-sectional area increases. Further, the temperature of the extruded material can also affect the reorientation of the fiber. As temperature increases, the fiber becomes more rapidly reoriented. Accordingly, as the temperature increases, the length of the exit die should be decreased to maintain the random orientation.

In the individual application of this technology, the ideal exit die length can be determined empirically with minimal experimentation.

The disclosed unique extruder geometry first randomizes fiber orientation resulting in an isotropic structural material and secondly, using the guidelines above, ensures that the composite manufacture does not re-introduce fiber orientation into the composite material.

Further, we have found that using the change in flow permits use of a unique cooling mode that permits rapid manufacture of the composite with higher productivity while maintaining the preferred isotropic fiber orientation. A coolant fluid input is introduced into the exit die at the change in direction such that the coolant fluid passes into the interior of the profile. The coolant fluid is passed into the interior of the profile at a rate sufficient to increase the cooling rate and heat removal from the resin fiber composite. The increased cooling rate permits an increased production rate and reduces costs.

A second useful aspect of the die configuration of the invention is the ability to introduce additional components, materials, structural elements, etc. into the internal spaces of the profile. A foamed thermoplastic material or thermosetting material can be introduced into the interior of the profile and parallel to the coolant flow. Further, metal or wood insert materials can be introduced using appropriate conveyors or introduction equipment. Lastly, linear members can be introduced into the interior of the profile which can be held in place by an interaction between the hot composite and the linear member. The linear member as used in this application can include metal wire, metal rod, organic fiber, inorganic (silicate) fiber, fiberglass rovings, fiberglass rod, or any other linear member that can cooperate with the profile to provide improved structural integrity or capacity.

For the purpose of this invention the term "composite" indicates a thermoplastic material having a continuous phase comprising a matrix comprising thermoplastic resin and dispersed in the resin a discontinuous reinforcing phase of a fiber. For the purpose of this invention the term "profile" indicates the product made using a particular exit die geometry. Such profiles are linear members that can be cut, mitered or otherwise shaped and formed into structural members commonly used in fenestration of windows and doors in commercial and residential real estate. Profiles are commonly substantially hollow extruded shapes typically having one or more internal structural webs extending from a wall to an opposite wall. Further, profiles can contain tracks for window and screen attachment and further can comprise screw anchor locations and other shapes or tracks useful in window and door manufacture. For the purpose of this patent, the term "coolant" refers to any fluid having a heat capacity sufficient to remove heat from the hot extruded material immediately after exiting the profile die. The term "fluid" can include both gases and liquids or liquid materials that can evaporate at temperatures common in the extruded material. The term "fluid" can also include humidified air or humidified coolant gases such as nitrogen, argon, etc. A preferred coolant is simply the ambient atmosphere or humidified atmosphere that can remove heat from the profile.

We have found that the internal cooling of the extruded profile of the invention permits higher line speeds without any substantial structural or dimensional drawbacks in profile production. Accordingly, the rate of flow of the coolant fluid (air, water, humidified air, etc.) is governed by the line speed of the extruder profile. The coolant can comprise air at 10–100 psi flowing through a 0.25 tube. In somewhat greater detail, the cold extrusion line should be operated at a rate such that the cooling capacity of the coolant passing through the profile is sufficient to maintain the mechanical and dimensional integrity of the profile when it is exposed to mechanical stress. In the extrusion process, the extruded profile is pulled using a tractor mechanism from the die. The thermoplastic material as it leaves the die is hot (greater than 200° C.) and is easily deformed. The dimensions of the profile are established and maintained by a vacuum block system which is conventional in such extrusion methods. The profile passing through the vacuum blocks is cooled in a water bath and then passes to the tractor device which mechanically drives the production system. The extrusion rate is typically matched to the rate the tractor device pulls the material through the process mechanism. Such a tractor device puts a substantial amount of stress on the extruded profile as it pulls the profile through the process. Both a vertical compression between the tractor treads and a linear stress along the line of the path of movement of the profile is exerted on the profile. The profile must be cool enough such that the stress from the tractor device does not deform the profile. Accordingly, the line speed of the extrusion should be maximized such that the use of the interior cooling method and other cooling means results in a dimensionally stable profile at the tractor device. We have found using the interior coolant stream that the line speed of the typical extrusion apparatus can be improved between 20 and 33% of linear output.

BRIEF DISCUSSION OF THE DRAWINGS

Figure 3:
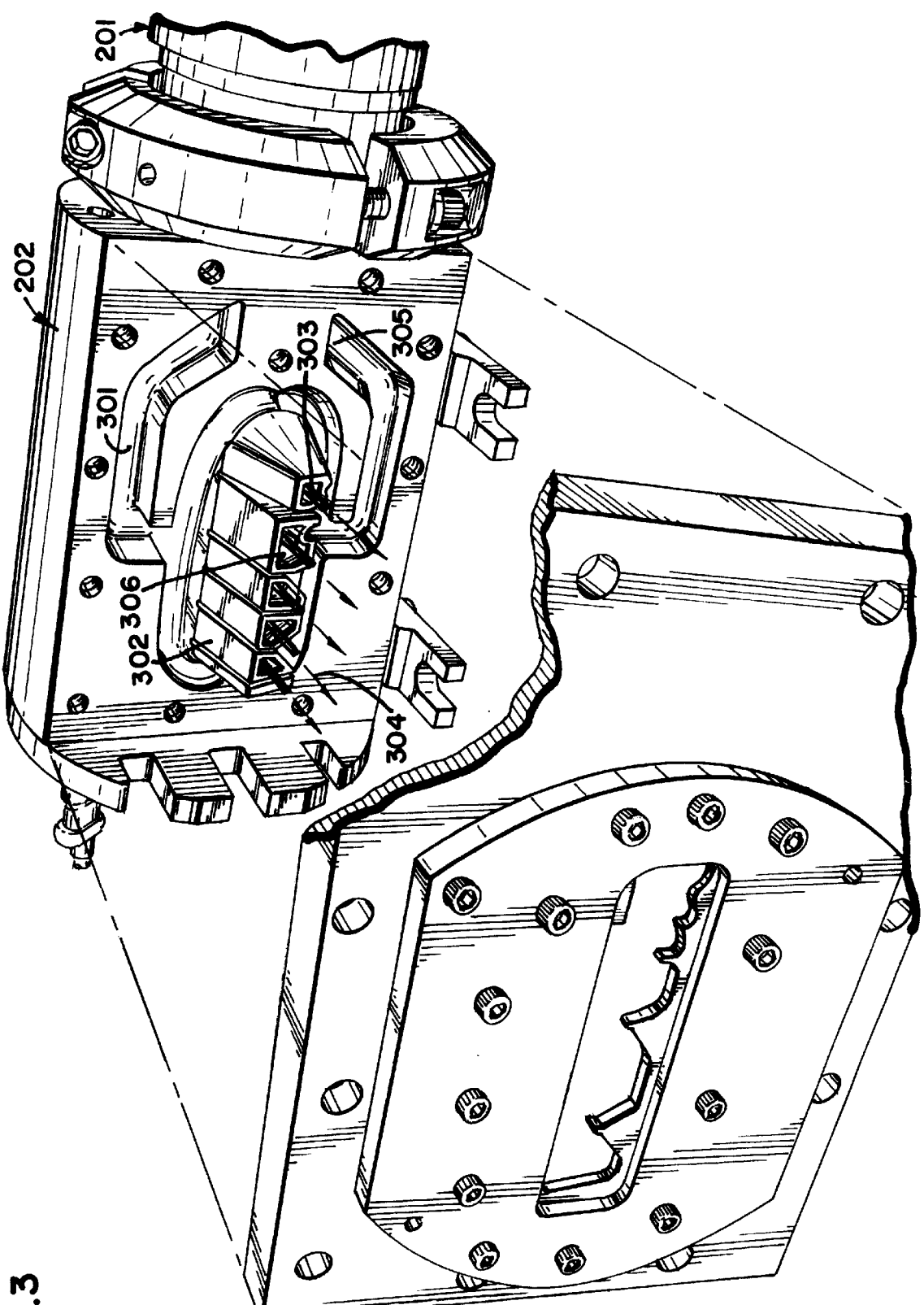

FIG. 3 is an isometric view of an exploded view of the profile die. The profile die shows the profile mandrel with the interior spaces and the coolant delivery system providing a coolant flow to the interior of the profile. No thermoplastic material is shown in the figure.

Figure 4:
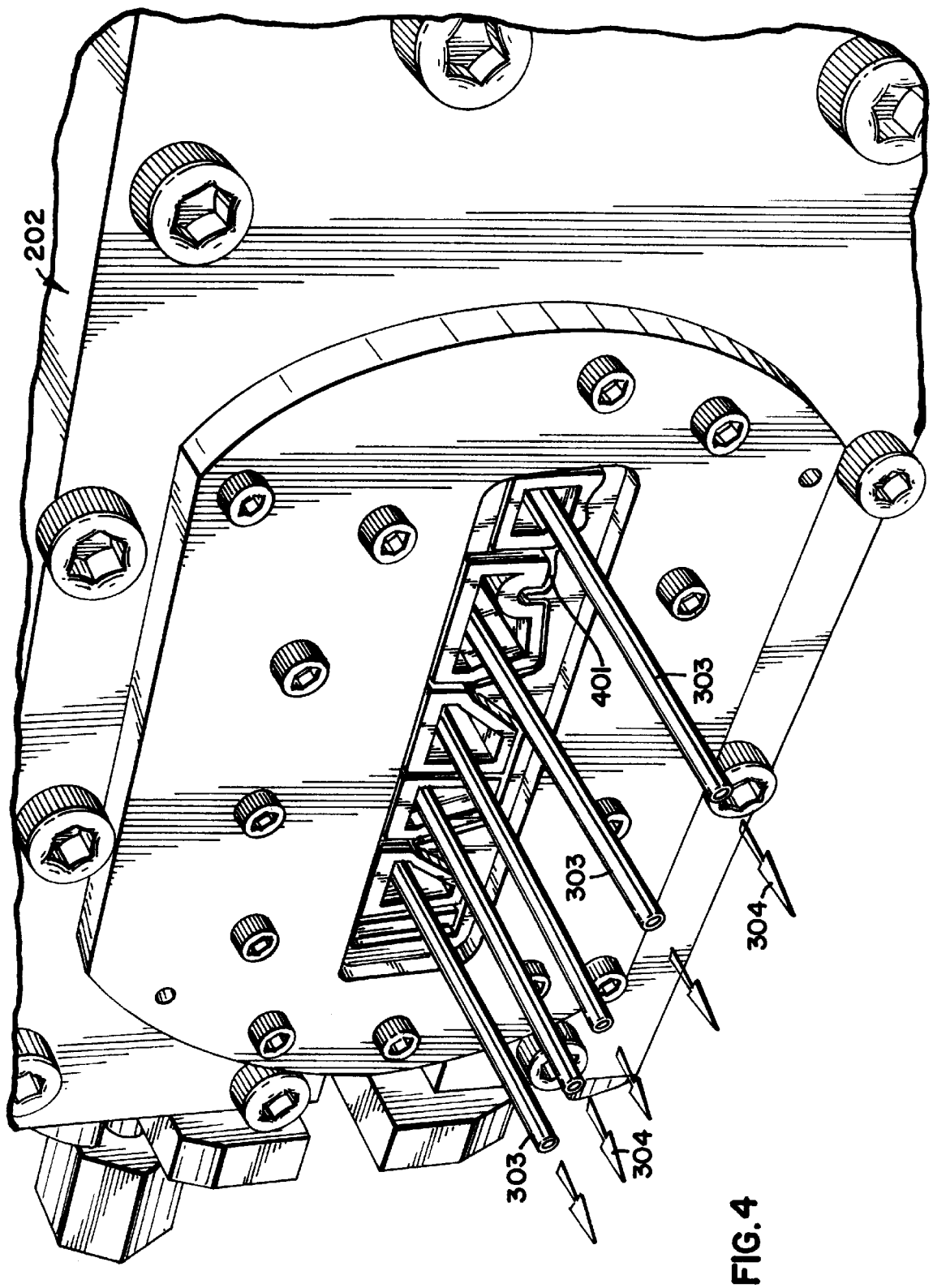

FIG. 4 is a close up view of an assembled exit die of the invention showing the means for delivering coolant into the interior of the extruded plastic profile (not shown).

Figure 5:
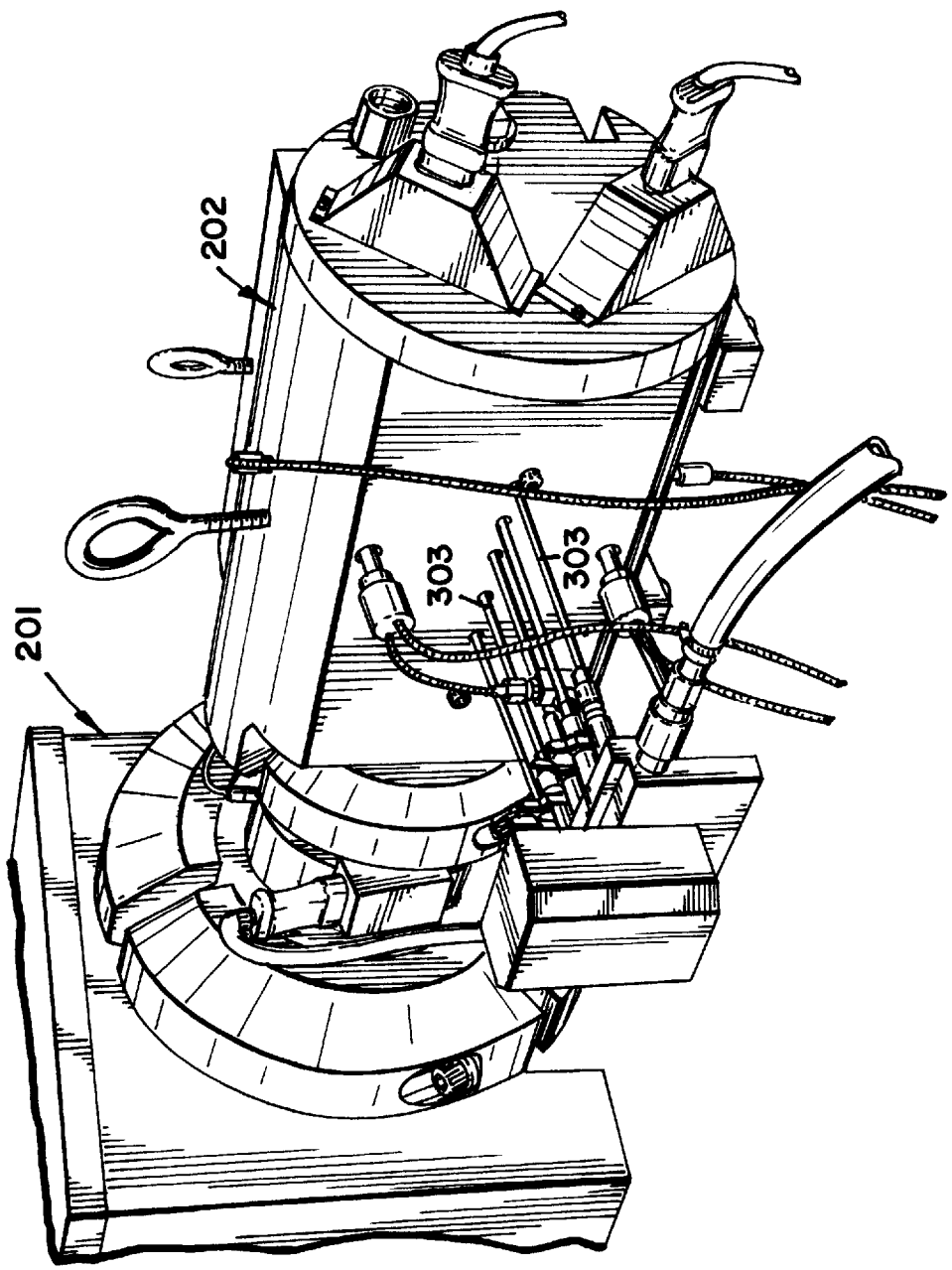

FIG. 5 is a reverse view of FIG. 3 showing the introduction of the means for delivering the coolant into the reverse of the profile die.

Figure 6:
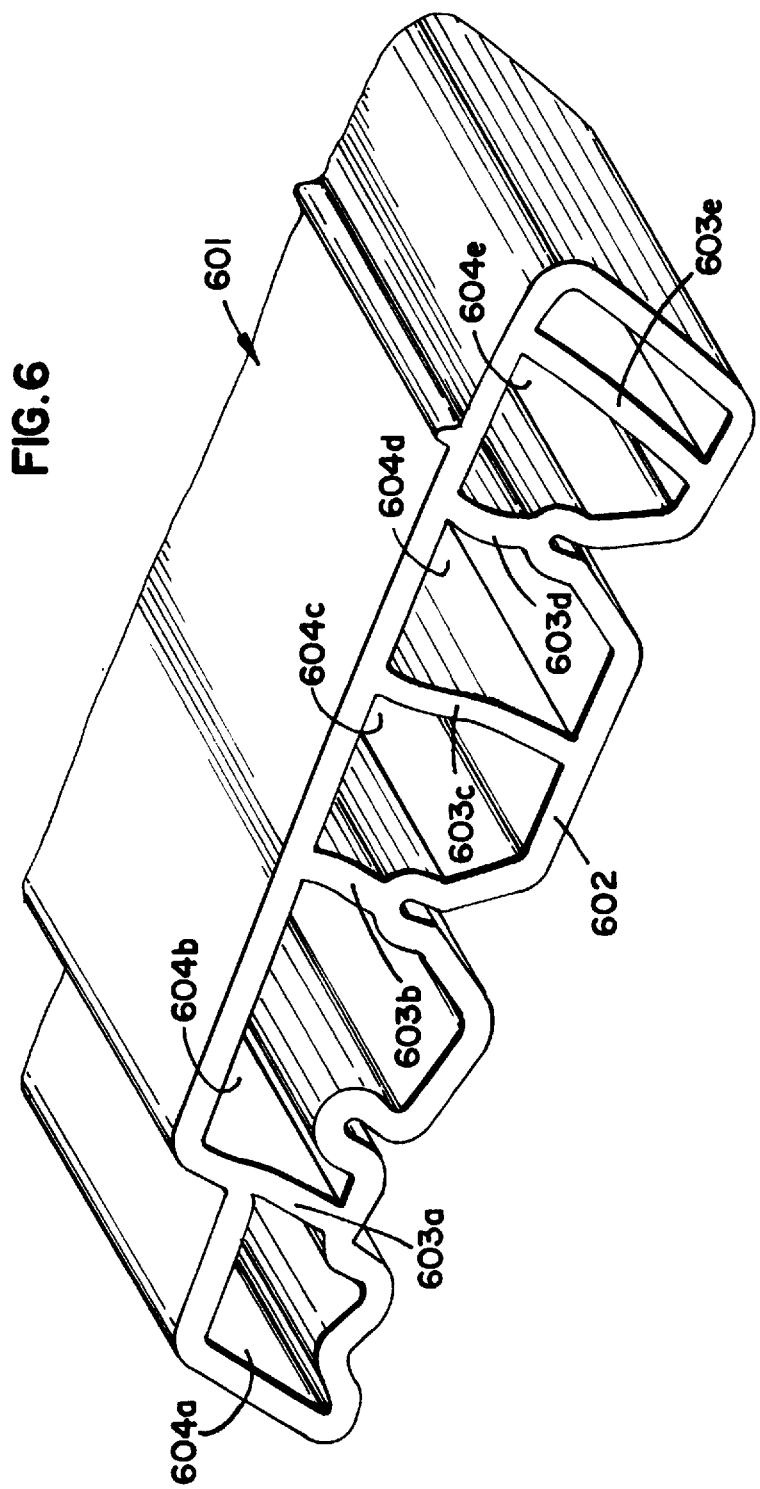

FIG. 6 is an isometric view of a section of the profile manufactured using the extruder and die of the invention. The profile 601 is generally defined by an exterior wall 602. The exterior wall 602 and internal support webs 603, 603a, 603b, 603c provide structural support for the profile. The exterior wall 602 and the support web 602a, 602b ... define interior spaces or hollow sections 604a, 604b, 604c, 604d. The coolant from the coolant supply means shown in FIG. 5 cool the interior of such a profile to improve cooling productivity and product quality.

DETAILED DISCUSSION OF THE INVENTION

This invention resides in a process of extruding a wood composite profile using a change in direction for the thermoplastic melt flow path and a unique cooling stream in the profile interior for forming a structural member. The composite material that can be used to make the members of the invention can comprise virtually any thermoplastic matrix forming material and a reinforcing fiber ingredient. In forming the profiles of the invention, the thermoplastic and the fiber can be separately added to the extruded device for formation of the profile. Alternatively, the thermoplastic and the fiber can be precombined to form a composite feed stock that can be used to make the composite profiles of the invention. Virtually any matrix forming thermoplastic can be used along with virtually any reinforcing fiber material. A preferred thermoplastic is polyvinyl chloride while commonly available cellulosic fiber such as wood fiber are preferred reinforcing ingredients. One available form for a premade composite material is in the form of a pellet made using extrusion technology. Such pellets can contain a continuous phase of the thermoplastic polymer and a reinforcing phase of a fiber.

Thermoplastic Polymers

The pellet of the invention comprises a composite made by combining a thermoplastic polymer with a cellulosic fiber under conditions of high temperature, pressure and shear. The pellet attains a surprisingly high density when compared to prior art materials resulting in improved physical and structural properties.

Thermoplastic polymers that can be used in the invention comprise well known classes of thermoplastic polymers including polyolefins such as polyethylene, polypropylene, poly(ethylene-copropylene), polyethylene-co-alphaolefin) and others. Polystyrene polymers can be used including polystyrene homopolymers, polystyrene copolymers and terpolymers; polyesters including polyethylene terephthalate, polybutylene terephthalate, etc. and halogenated polymers such as polyvinyl chloride, polyvinylidene chloride and others.

The pellet of the invention uses a cellulosic fiber. The cellulosic fiber commonly comprises fibers having a high aspect ratio made of cells with cellulosic cell walls. During the process of the invention, the cell walls are disrupted and polymers introduced into the interior void volume of the cells under conditions of high temperature and pressure. The cellulosic material can be derived from a variety of sources including hard and soft wood products and by-products, sugar cane, cotton, flax and other known sources of cellulosic materials. The preferred source of cellulosic fiber for this invention comprises wood fiber which can be product or by-product of the manufacture of lumber or other wood products.

Polyvinyl chloride is a common commodity thermoplastic polymer. Vinyl chloride monomer is made from a variety of different processes such as the reaction of acetylene and hydrogen chloride and the direct chlorination of ethylene. Polyvinyl chloride is typically manufactured by the free radical polymerization of vinyl chloride resulting in a useful thermoplastic polymer. After polymerization, polyvinyl chloride is commonly combined with thermal stabilizers, lubricants, plasticizers, organic and inorganic pigments, fillers, biocides, processing aids, flame retardants and other commonly available additive materials. Polyvinyl chloride can also be combined with other vinyl monomers in the manufacture of polyvinyl chloride copolymers. Such copolymers can be linear copolymers, branched copolymers, graft copolymers, random copolymers, regular repeating copolymers, block copolymers, etc. Monomers that can be combined with vinyl chloride to form vinyl chloride copolymers include a acrylonitrile, alpha-olefins such as ethylene, propylene, etc., chlorinated monomers such as vinylidene dichloride, acrylate monomers such as acrylic acid, methylacrylate, methylmethacrylate, acrylamide, hydroxyethyl acrylate, and others, styrenic monomers such as styrene, alphamethyl styrene, vinyl toluene, etc.; vinyl acetate; and other commonly available ethylenically unsaturated monomer compositions.

Such monomers can be used in an amount of up to about 50 mol-%, the balance being vinyl chloride. Polymer blends or polymer alloys can be useful in manufacturing pellets used in the process of the invention. Such alloys typically comprise two miscible polymers blended to form a uniform composition. Scientific and commercial progress in the area of polymer blends has lead to the realization that important physical property improvements can be made not by developing new polymer material but by forming miscible polymer blends or alloys. A polymer alloy at equilibrium comprises a mixture of two amorphous polymers existing as a single phase of inability mixed segments of the two macro molecular components. Miscible amorphous polymers form glasses upon sufficient cooling and a homogeneous or miscible polymer blend exhibits a single, composition dependent glass transition temperature ($T_g$), or as an immiscible or non-alloyed blend of polymers typically displays two or more glass transition temperatures associated with immiscible polymer phase. In the simplest cases, the properties of polymer alloys reflect a composition weighted average of properties possessed by the components. In general, however, the property dependence on composition varies in a complex way with a particular property, the nature of the components (glassy, rubbery or semi-crystalline), the thermodynamic state of the blend, and its mechanical state whether molecules and phases are oriented. Polyvinyl chloride forms a number of known polymer alloys including, for example, polyvinyl chloride/nitrile rubber; polyvinyl chloride and related chlorinated copolymers and terpolymers of polyvinyl chloride or vinylidine dichloride; polyvinyl chloride/alphamethyl styrene-acrylonitrile copolymer blends; polyvinyl chloride/polyethylene; polyvinyl chloride/chlorinated polyethylene and others.

The primary requirement for the substantially thermoplastic polymeric material is that it retain sufficient thermoplastic properties to permit melt blending with wood fiber, permit formation of linear extrudate pellets, and to permit the composition material or pellet to be extruded in a thermoplastic process forming the rigid structural member. Polyvinyl chloride homopolymers copolymers and polymer alloys are available from a number of manufacturers including B. F. Goodrich, Vista, Air Products, Occidental Chemicals, etc. Preferred polyvinyl chloride materials are polyvinyl chloride homopolymer having a $M_n$ molecular weight of about 90,000±50,000, most preferably about 88,000±10,000.

Composite materials consist of the continuous matrix phase that surrounds a reinforcing-phase structure. Typically the continuous matrix phase comprises a thermoplastic or thermosetting material. The reinforcing-phase structure typically comprises a fiber particulate filler or other discontinuous phase material. The composite typically comprise a continuous thermoplastic matrix phase having an embedded structure including: (1) a three-dimensional distribution of randomly oriented reinforcing elements, e.g., a particulate-filled composite; (2) a two-dimensional distribution of randomly oriented elements such as a chopped fiber mat; (3) an order two-dimensional structure of isometry in the plane of the structure, e.g., an impregnated cloth structure; or (4) a highly aligned array of parallel fibers randomly distributed normal to the fiber direction including a filament wanded structure, a prepared sheet consisting of parallel orders of fibers impregnated with the matrix thermoplastic. Reinforcement materials improve the strength of the given thermoplastic matrix. Various types of fiber reinforcements are available including glass, vitreous silica, e-glass, s-glass, carbon film types (derived from polyacrylonitrile, rayon or high carbon fiber). Carbon fibers typically exhibiting high strength and high stiffness, polymer (aramide, olefin, nylon, rayon), inorganic (monocrystalline alumina, polycrystalline alumina, whisker alumina, alumina silicates, asbestos, tungsten, boron fibers, boron nitride fibers, carbon core silicon carbide, polycrystalline silicon carbide, polycrystal zirconia, etc.), and metals (beryllium, molybdenum, steel, tungsten, aluminum, etc.). Such reinforcements can be augmented or diluted using plate-like or particulate materials such as clay, sand, mica, asbestos, etc.

Wood Fiber

Wood fiber, in terms of abundance and suitability can be derived from either soft woods or evergreens or from hard woods commonly known as broad leaf deciduous trees. Soft woods are generally preferred for fiber manufacture because the resulting fibers are longer, contain high percentages of lignin and lower percentages of hemicellulose than hard woods. While soft wood is the primary source of fiber for the invention, additional fiber make-up can be derived from a number of secondary or fiber reclaim sources including bamboo, rice, sugar cane, and recycled fibers from newspapers, boxes, computer printouts, etc.

However, the primary source for wood fiber used in the process of this invention comprises the wood fiber by-product of sawing or milling soft woods commonly known as sawdust or milling tailings. Such wood fiber has a regular reproducible shape and aspect ratio. The fibers based on a random selection of about 100 fibers are commonly at least 0.1 mm in length. The fiber commonly has an aspect ratio of at least 1.8. Preferably, the fibers are 0.1 to 10 mm in length, 0.3 to 1.5 mm in thickness with an aspect ratio between 2 and 7, preferably 2.5 to 6.0. The preferred fiber for use in the process of this invention are fibers derived from processes common in the manufacture of windows and doors. Wooden members are commonly ripped or sawed to size in a cross grain direction to form appropriate lengths and widths of wood materials. The by-product of such sawing operations is a substantial quantity of sawdust. In shaping a regular shaped piece of wood into a useful milled shape, wood is commonly passed through machines which selectively removes wood from the piece leaving the useful shape. Such milling operations produces substantial quantities of sawdust or mill tailing by-products. Lastly, when shaped materials are cut to size and mitered joints, butt joints, overlapping joints, mortise and tenon joints are manufactured from pre-shaped wooden members, substantial trim is produced. Such large trim pieces are commonly cut and machined to convert the larger objects into wood fiber having dimensions approximating sawdust or mill tilling dimensions. These materials can be dry blended to form input to the pelletizing function. Further, the streams can be pre-mitered to the preferred particle size of sawdust or can be post-milled.

Such sawdust material can contain substantial proportions of a by-product stream. Such by-products include polyvinyl chloride or other polymer materials that have been used as coating, cladding or envelope on wooden members; recycled structural members made from thermoplastic materials such as polyethylene, polypropylene, polystyrene, polyethylene terephthalate, etc.; polymeric materials from coatings; adhesive components in the form of hot melt adhesives, solvent based adhesives, powdered adhesives, etc.; paints including water based paints, alkyd paints, epoxy paints, etc.; preservatives, anti-fungal agents, anti-bacterial agents, insecticides, etc., and other streams common in the manufacture of wooden doors and windows. The total by-product stream content of the wood fiber materials is commonly less than 25 wt-% of the total wood fiber input into the polyvinyl chloride wood fiber product. Of the total recycle, approximately 10 wt-% of that can comprise a vinyl polymer commonly polyvinyl chloride. Commonly, the intentional recycle ranges from about 1 to about 25 wt-%, preferably about 2 to about 20 wt-%, most commonly from about 3 to about 15 wt-% of contaminants based on the sawdust.

Pellets

The polyvinyl chloride and wood fiber used in this process is preferably in the form of a wood fiber polyvinyl chloride composite pellet. The pellet is generally formed using a thermoplastic extrusion process. The preferred process for making the wood fiber polyvinyl chloride pellets used in the present invention is disclosed in U.S. Pat. Nos. 5,441,801 and 5,518,677.

Wood fiber can be introduced into a pellet making process in a number of sizes. We believe that the wood fiber should have a minimum size of length and width of at least 0.1 mm because smaller particles produce reduced physical properties in the member and because wood flour tends to be explosive at certain wood to air ratios. Further, wood fiber of appropriate size and an aspect ratio greater than 1 tends to increase the physical properties of the extruded structural member.

However, useful structural members can be made with a fiber of large size. Fibers that are up to 3 cm in length and 0.5 cm in thickness can be used as input to the pellet or linear extrudate manufacturing process. Particles of this size, however, do not produce the highest surface quality structural members or maximized strength. Large particle wood fiber can be reduced in size by grinding or other similar processes that produce a fiber similar to sawdust having the stated dimensions and aspect ratio. One further advantage of manufacturing sawdust of the desired size is that the fiber material can be pre-dried before introduction into the pellet manufacturing process.

The polyvinyl chloride and wood fiber are intimately contacted to form the composite material at high temperatures and pressures to insure that the wood fiber and polymeric material are wetted, mixed and extruded in a form such that the polymer material, on a microscopic basis, coats and flows into the pores, cavities, and interstitial voids of the fibers.

The fibers are preferably oriented by the extrusion process in the extrusion direction. Such orientation causes an anisotropic overlapping of adjacent parallel fibers and polymeric coating of the oriented fibers resulting in a material useful for manufacture of improved structural members with improved physical properties. The structural members have substantially increased strength and tensile modulus with a coefficient of thermal expansion and a modulus of elasticity that is optimized for window and doors. The properties are a useful compromise between wood, aluminum and neat polymer.

Moisture control is an important element of manufacturing a useful linear extrudate or pellet. Depending on the equipment used and processing conditions, control in the water content of the linear extrudate or pellet can be important in forming a successful structural member substantially free of internal voids or surface blemishes. Water present in the sawdust during the formation of pellet or linear extrudate when heated can flash from the surface of the newly extruded structural member and can come as a result of a rapid volatilization, form a steam bubble deep in the interior of the extruded member which can pass from the interior through the hot thermoplastic extrudate leaving a substantial flaw. In a similar fashion, surface water can bubble and leave cracks, bubbles or other surface flaws in the extruded member.

Trees when cut, depending on relative humidity and season, can contain from 30 to 300 wt-% water based on fiber content. After rough cutting and finishing into sized lumber, seasoned wood can have a water content of from 20 to 30 wt-% based on fiber content. Kiln-dried sized lumber cut to length can have a water content typically in the range of 8 to 12%, commonly 8 to 10 wt-% based on fiber. Some wood source, such as poplar or aspen, can have increased moisture content while some hard woods can have reduced water content.

Because of the variation in water content of wood fiber source and the sensitivity of extrudate to water content control of water to a level of less than 8 wt-% in the pellet is important. When using vented equipment in manufacturing the extruded linear member, a water content of greater than 8 wt-% can be tolerated if processing conditions are such that vented extrusion equipment can dry the thermoplastic material prior to the final formation of the structural member at the extrusion head.

The pellets or linear extrudate of the invention are made by extrusion of the polyvinyl chloride and wood fiber composite through an extrusion die resulting in a linear extrudate that can be cut into a pellet shape. The pellet cross-section can be any arbitrary shape depending on the extrusion die geometry. However, we have found that a regular geometric cross-sectional shape can be useful. Such regular cross-sectional shapes include a triangle, a square, a rectangle, a hexagonal, an oval, a circle, etc. The preferred shape of the pellet is a regular cylinder having a roughly circular or somewhat oval cross-section.

The preferred pellet is a right circular cylinder, the preferred radius of the cylinder is at least 1.5 mm with a length of at least 1 mm. Preferably, the pellet has a radius of 1 to 5 mm and a length of 1 to 10 mm. Most preferably, the cylinder has a radius of 2.3 to 2.6 mm, a length of 6.4 to 8.5 mm, and a bulk density of about 0.7 to 0.8 gm/mm$^3$.

We have found that the interaction, on a microscopic level, between the polymer mass and the wood fiber is an important element of the invention. We have found that the physical properties of an extruded member are improved when the polymer melt during extrusion of the pellet or linear member thoroughly wets and penetrates the wood fiber particles. The thermoplastic material comprises an exterior continuous organic polymer phase with the wood particle dispersed as a discontinuous phase in the continuous polymer phase. The material during mixing and extrusion produces an aspect ratio of at least 1.1 and preferably between 2 and 4, optimizes orientation such as at least 20%, preferably 40% of the fibers are oriented, above random orientation of 40–50%, in an extruder direction and are thoroughly mixed and wetted by the polymer such that all exterior surfaces of the wood fiber are in contact with the polymer material. This means, that any pore, crevice, crack, passage way, indentation, or interstitial void is fully filled by thermoplastic material. Such penetration as attained by ensuring that the viscosity of the polymer melt is reduced by operations at elevated temperature and the use of sufficient pressure to force the polymer into the available internal pores, cracks and crevices in and on the surface of the wood fiber.

During the pellet or linear extrudate manufacture, substantial work is done in providing a uniform dispersion of the wood into the polymer material. Such work produces substantial orientation which when extruded into a final structural member, permits the orientation of the fibers in the structural member to be increased in the extruder direction resulting in improved structural properties in the sense of compression strength in response to a normal force or in a torsions or flexing mode.

The pellet dimensions are selected for both convenience in manufacturing and in optimizing the final properties of the extruded materials. A pellet that is with dimensions substantially less than the dimensions set forth above are difficult to extrude, pelletize and handle in storage. Pellets larger than the range recited are difficult to cool, introduce into extrusion equipment, melt and extrude into a finished structural member.

Profile

The extruded profile comprises an exterior wall or shell substantially enclosing a hollow interior. The interior can contain at least one structural web, providing support for the walls, and can contain at least one fastener anchor web to ensure that the composite member can be attached to other members, using commonly available fasteners which are strongly retained by the fastener anchor web.

The structural member is typically shaped by the extrusion process such that the member can replace a structural or trim component of existing window or door manufacture. Such structural members can take a variety of shapes which surface contours are adapted to the window or door assembly process and are adapted to the operation of working parts of the window or door. Such structural members can contain screen insert supports, sliding window or sliding door supports, cut-outs for hardware installation, anchor locations, etc. The thermoplastic composite material typically forms a shell or wall exterior substantially surrounding the interior space. The exterior shell or wall contains a surface shaped as needed to assemble the window and surfaces needed for cooperation with the other working parts of the window and the rough opening as described above.

The interior of the structural member is commonly provided with one or more structural webs which, in a direction of applied stress, supports the structure. Structural web typically comprises a wall, post, support member, or other formed structural element which increase compressive strength, torsion strength, or other structural or mechanical property. Such structural web connects the adjacent or opposing surfaces of the interior of the structural member. More than one structural web can be placed to carry stress from surface-to-surface at the locations of the application of stress to protect the structural member from crushing, torsional failure, or general breakage. Typically, such support webs are extruded or injection molded during the manufacture of the structural material. However, a support can be post added from parts made during separate manufacturing operations.

The internal space of the structural member can also contain a fastener anchor or fastener installation support. Such an anchor or support means provides a locus for the introduction of a screw, nail, bolt or other fastener used in either assembling the unit or anchoring the unit to a rough opening in the commercial or residential structure. The anchor web typically is conformed to adapt itself to the geometry of the anchor and can simply comprise an angular opening in a formed composite structure, can comprise opposing surfaces having a gap or valley approximately equal to the screw thickness, can be geometrically formed to match a key or other lock mechanism, or can take the form of any commonly available automatic fastener means available to the window manufacturer from fastener or anchor parts manufactured by companies such as Amerock Corp., Illinois Tool Works and others.

The structural member made by the process of the invention can have premolded paths or paths machined into the molded thermoplastic composite for passage of door or window units, fasteners such as screws, nails, etc. Such paths can be countersunk, metal lined, or otherwise adapted to the geometry or the composition of the fastener materials. The structural member can have mating surfaces premolded in order to provide rapid assembly with other window components of similar or different compositions having similarly adapted mating surfaces. Further, the structural member can have mating surfaces formed in the shell of the structural member adapted to moveable window sash or door sash or other moveable parts used in window operations.

The structural member of the invention can have a mating surface adapted for the attachment of the weigh subfloor or base, framing studs or side molding or beam, top portion of the structural member to the rough opening. Such a mating surface can be flat or can have a geometry designed to permit easy installation, sufficient support, and attachment to the rough opening. The structural member shell can have other surfaces adapted to an exterior trim and interior mating with wood trim pieces and other surfaces formed into the exposed sides of the structural member adapted to the installation of metal runners, wood trim parts, door runner supports, or other metal, plastic, or wood members commonly used in the assembly of windows and doors.

Moisture Control

Wood fiber, sawdust, has a substantial proportion of water associated with the fiber. Water naturally is incorporated in the growth cycle of living wood. Such water remains in the wood even after substantial drying cycles in lumber manufacture. In seasoned finished lumber used in the manufacture of wooden structural members, the sawdust derived from such operations can contain about 20% water or less. We have found that control of the water common in wood fibers used in the polyvinyl chloride/wood fiber composite materials and pellet products of the invention is a critical aspect to obtaining consistent high quality surface finish and dimensional stability of the PVC/wood fiber composite structural members. During the manufacture of the pellet material, we have found that the removal of substantial proportion of the water is required to obtain a pellet optimized for further processing into the structural members. The maximum water content of the polyvinyl chloride/wood fiber composition or pellet is 10 wt-% or less, preferably 8.0 wt-% or less and most preferably the composition or pellet material contains from about 0.01 to 3.5 wt-% water. Preferably, the water is removed after the material is mixed and formed into an extrusion prior to cutting into pellets. At this stage, water can be removed using the elevated temperature of the material at atmospheric pressure or at reduced pressure to facilitate water removal. The production can be optimized to result in substantial control and uniformity of water in the pellet product.

Extruder

Figure 1:
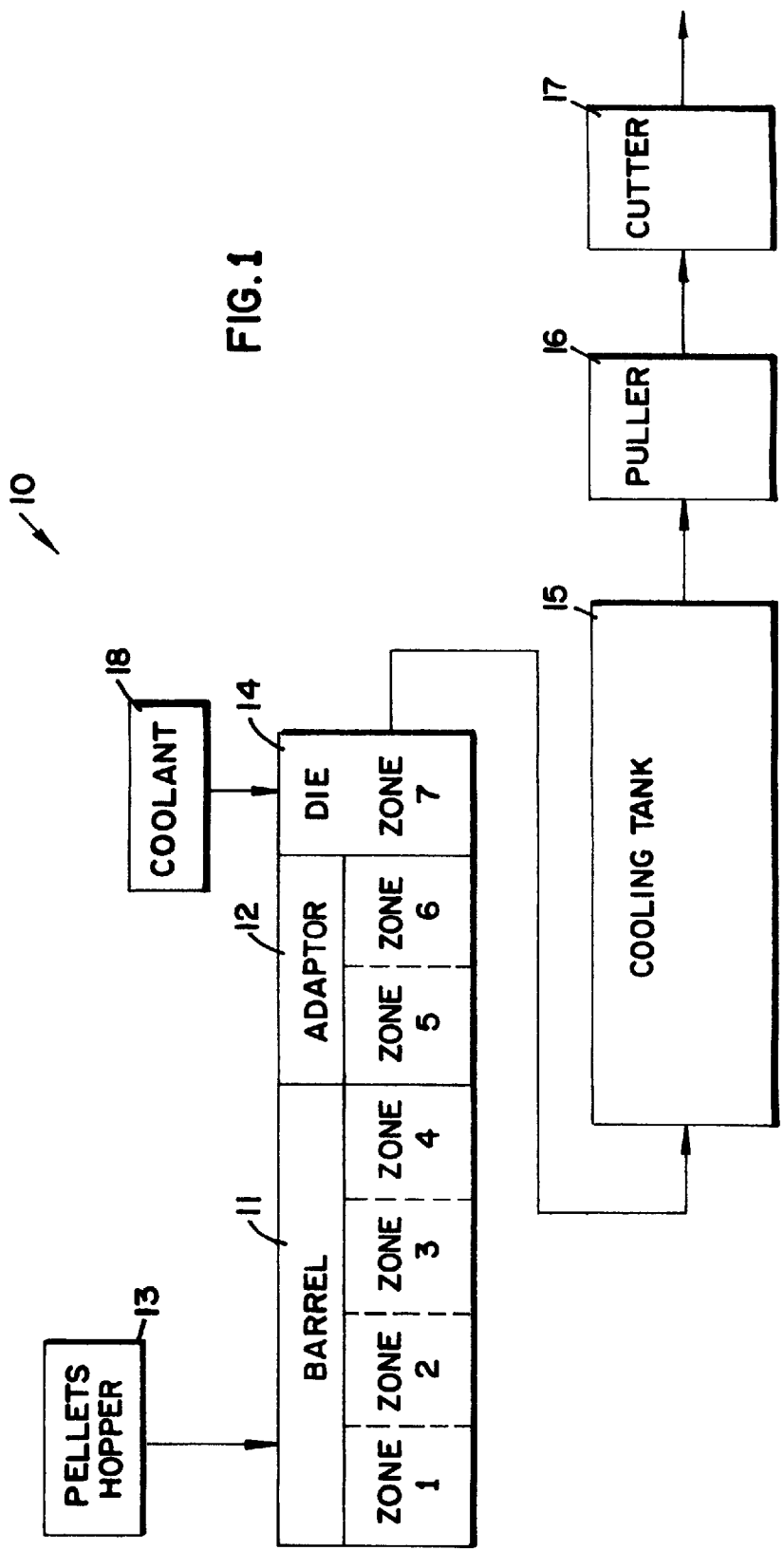
FIG. 1 is a block diagram of the extruder apparatus of the invention. In die zone 14 the extruded material undergoes a change in path or direction (not shown) and when formed into a profile is cooled using a coolant stream.

The preferred extruder for performing the process of the present invention is a commercially available twin screw Extruder referred to generally by the numeral 10 in FIG. 1. The preferred extruder uses a positive displacement pump for the controlled transport of material through a die. Major components of the unit are:

(a) a barrel 11 and two screws to transport, mix, and compress the composite material;
(b) a heating and cooling system to control the heat needed for processing;
(c) a drive train to power the screws; and
(d) a control station for controlling the extruder, including instruments to monitor the process and indicate possible problems.

Barrel 11 has a meshing, dual, conical taper bore. The combination of barrel taper and screw flight provides proper compression of the composite material. Barrel 11 is manufactured in three sections but has four operational zones.

The larger outside diameter of the screws in the barrel intake area, zone 1, allows for good intake of material and provides a larger surface area for heat transfer into the material. Between zones 2 and 3 is a vent to allow moisture and other gases to escape from barrel 11. A vacuum is preferably applied to the vent to enhance moisture removal. Zone 4 is a metering zone where the material is compressed and metered out to a die 14. Between die 14 and extruder barrel 11 is an adapter 12 having two zones, referred to in FIG. 1 as zones 5 and 6. Die 14 has one zone, referred to in FIG. 1 as zone 7.

The screws each have a hollow core through which heat transfer liquid is circulated. This allows the transfer of unwanted frictional heat from zone 4 back toward zone 1. The four heat zones on barrel 11 are independently controlled by electric heat bands and heat exchangers for accurate stabilization of operational temperatures. Likewise, zones 5 and 6 on adapter 12 and zone 7 on die 14 are independently controlled by electric heater bands and heat exchangers for accurate temperature control. The temperature of the heat transfer liquid in the screws is also independently controlled. The preferred die is manufactured to conform to the desired profile cross-section. Configuration of extrusion dies is well known to those skilled in the art.

Heat is applied to the four barrel zones by the electric heat bands. Heat is removed from the barrel zones by circulating oil through coils wound around the barrels at zones 2, 3 and 4. The oil is circulated by a pump unit through a heat exchanger located in the base of the extruder. The barrel cooling system is equipped with flow indicators for a visual check of the cooling performance in each barrel zone. Screw core cooling/heating is accomplished with an independent temperature control unit.

The drive train begins with an infinitely variable speed, constant torque drive motor coupled to a speed reducer. From the speed reducer, the drive train evolves into a two-shaft distribution gear drive. Since the drive shafts are on the center lines of their corresponding tapered screws, it is possible to use large gears for torque transfer and larger bearings to take up the axial force (back pressure) generated in the operation of the extruder.

In order to achieve consistent quality of product, the speed and motor load of the drive train and axial load of the thrust bearings are measured. Flow of cooling oil to zones 1 through 7 is monitored by system flow indicators. Pellets are preferably introduced in zone 1 of barrel 11 from a pellet hopper 13. Flow of pellets into barrel 11 is preferably metered by a feed screw.

Proximate the distal end of die 14 is a cooling tank 15 through which is preferably recirculated cooled water. Within cooling tank 15, submerged beneath the recirculated cooled water, are one or more cooling calibration locks. Each cooling calibration block has a passageway approximately corresponding in size to the cross-section of the profile and approximately axially aligned with the extruder die. A vacuum is applied at the surface of the passage.

Proximate the distal end of cooling tank 15 is a puller 16. The puller 16 is approximately axially aligned with the extruder die and the calibration blocks within cooling tank 15. Puller 16 has two oppositely disposed belts spaced apart approximately the height of the extruded profile cross-section. Proximate the distal end of puller 16 is a cutter 17.

A cutter 17, for cutting the extruded profile to predetermined lengths, is approximately axially aligned with die 14 calibration blocks of cooling tank 15 and puller 16. Cutter 17 has a cutting surface and blade mounted for simultaneous movement with the extruded profile to eliminate relative lateral movement between the profile and the cutter blade when the profile is cut.

An experiment was conducted to demonstrate the inventive process can produce an improved profile. Materials were made (Ex. 1–7) with a linear flow direction. A 90° flow change was used to produce Ex. 8–20.

TABLE I

| EX | MATERIAL | YOUNG'S MODULUS $\times 10^3$ |
|---|---|---|
| 1 | 60% wood 20 mesh special with flow | 891 |
| 2 | 60% wood 40 mesh special with flow | 915 |
| 3 | Sill CM 80 new screw cross-flow | 481 |
| 4 | Sill CM 80 new screw with flow | 757 |
| 5 | Sill CM 80 old screw cross flow | 436 |
| 6 | Sill CM 80 old screw with flow | 759 |
| 7 | 20 mesh 90° cross head cross flow | 646 |
| 8 | 20 mesh 90° cross head with flow | 723 |
| 9 | 40 mesh 90° cross head cross flow | 643 |
| 10 | 40 mesh 90° cross head with flow | 706 |
| 11 | CM 80 new screws 60% wood 40 mesh cross flow preheated | 657 |
| 12 | CM 80 new screws 60% wood 40 mesh with flow preheated | 769 |
| 13 | CM 80 new screws 60% wood 40 mesh cross flow | 698 |
| 14 | CM 80 new screws 60% wood 40 mesh with flow | 897 |
| 15 | CM 80 new screws 60% wood 20 mesh cross flow | 729 |
| 16 | CM 80 new screws 60% wood 20 mesh with flow | 801 |
| 17 | CM 80 new screws regular pellets cross flow preheated | 706 |
| 18 | CM 80 new screws regular pellets with flow preheated | 751 |
| 19 | CM 80 new screws regular pellets cross flow | 556 |
| 20 | CM 80 new screw | 671 |

Examples 3 and 5 were done with prior art materials. The modulus is substantially below the "with the flow" material. Examples 8–20 show materials of the invention have substantially the same modulus in all direction.

Process

In the profile extrusion process of the present invention, the pellets formed from the pellet process are the input material. The pellets are placed, as shown in FIG. 1, in hopper 13 and fed into zone 1 of extruder barrel 11. The preferred screw speed is 10 rpm±5 rpm. The following table gives the zone temperatures for barrel zones 1 through 4, adapter zones 5 through 6, die zone 7, and screw oil within an acceptable variation.

| Zone | Temperature |
|---|---|
| 1 | 185° C. ± 10° C. |
| 2 | 185° C. ± 10° C. |
| 3 | 180° C. ± 10° C. |
| 4 | 180° C. ± 10° C. |
| 5 | 170° C. ± 10° C. |
| 6 | 175° C. ± 10° C. |
| 7 | 175° C. ± 10° C. |
| Screw Oil | 180° C. ± 10° C. |

The lineal output is about 4 to 8 feet/min and the input flow rate is about 3 to 6 lb/min.

Through barrel zones 1–4, the composite material is thoroughly melted and mixed. Between zones 2 and 3, a vacuum is applied to remove additional moisture from the composite material.

As the extruded profile leaves the profile die it is still semi-molten and dimensionally unstable. To control the dimensions of the profile the extruded product is preferably cooled internally using a flow of coolant from coolant source 18 and is also extruded into cooling tank 15 having one or more cooling stations and calibration blocks. The extruded profile blocks within the cooling tank are submerged and recirculated water preferably held at approximately 65° F. or cooler. A vacuum is applied to the interior surface of the cooling block openings which in turn applies the vacuum to the exterior surface of the profile. Application of this vacuum to the exterior surface of the profile is particularly important in maintaining the dimensional stability of profiles which are often substantially hollow.

The extruded profile leaves the cooling tank and enters a puller. The puller is controlled to pull the profile from cooling tank 15 to cutter 17 at a rate approximately equal to the rate of extrusion from die 14. At the cutter the extruded profile is cut into predetermined lengths. Preferably the cutting blade moves in the direction of movement of the extruded profile so that there is no relative lateral motion between the extruded profile and the cutting blade.

In the profile die section the flow of thermoplastic composite experiences a change in direction to randomize the fiber orientation. This change in direction permits the use of a novel coolant system. First, the change in direction of the thermoplastic composite flow ensures that each fiber is optimized in orientation to provide the best structural properties to the composite. Further, the change in direction of flow permits the increase in cooling rate by the installation of an outlet for a cooling flow installed in the extrusion die such that the cooling flow is directed to the interior of the hollow plastic profile. Directing the coolant flow into the interior of the plastic profile permits substantially greater cooling to the profile after extrusion. The increased cooling rates permit the extrusion of a thicker part, while maintaining accurate profile dimensions. Further, increased cooling provides a greater control over structural properties in the profile.

Figure 2:
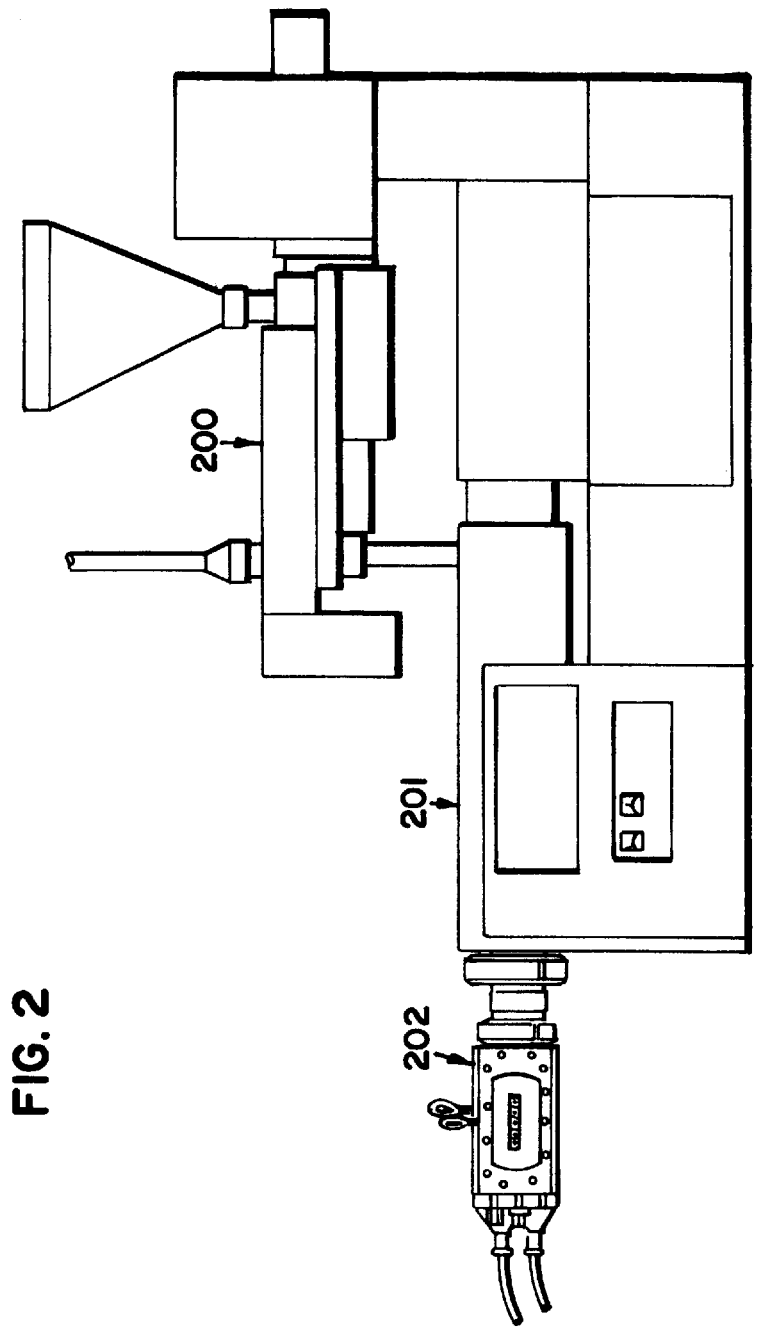
FIG. 2 is an overall view of the extruder of the invention including the extruder device generally at 200 and the profile die at 202 that contains both the change in direction of thermoplastic composite flow and the introduction of a coolant into the interior of the extruded profile.

FIG. 2 is a view of an device having the unique extruder/profile die 202 installed. The die contains the unique change in direction for the thermoplastic flow and also contains the installation of means to introduce a coolant flow into the hollow interior of the extruded profile. The apparatus in FIG. 1 generally comprises a materials handling section 200, an extrusion section 201 and a profile die extrusion head 202. In a materials handling section 200, polymer and wood fiber are blended and delivered to a heated single or dual screw extruder mechanism 201. The extruder provides a molten flow of the thermoplastic composite comprising a thermoplastic polymer and a wood fiber to the extrusion profile die 202. The profile die 202 contains the change in direction of flow to the thermoplastic composite material and also contains means to introduce the coolant flow into the hollow interior of the profile after it leaves the extruder die.

FIG. 3 is an enlarged isometric view of the extruder profile die assembly 102 in FIG. 1. FIG. 3 shows the extruder 201 and the path of the thermoplastic composite 301. The flow of thermoplastic (not shown) enters the pathway 301 from extruder 201 through an opening 305. The profile die mandrel 302 shapes the profile (not shown) and provides an opening 306 for the cooling means for introducing the coolant flow 303 into the interior of the extruded profile (not shown) along with the means for introducing the coolant flow 303 and the direction of coolant flow 304.

FIG. 4 shows the assembled extruder profile die assembly shown in exploded view in FIG. 3 the die length is about 2 inches. The profile (not shown) leaves die 202 from space 401 that defines the profile in a substantially complete form requiring only a calibration block to maintain shape until cooling is complete. Calibration blocks are conventional equipment, however, the cooling means 303 shown in the drawing provide substantial advantages to the extruding method of the invention. Also shown in the drawing is the direction of flow of the coolant 304 used to cool the hollow interior of the extruded profile member.

FIG. 5 is an isometric view of the reverse of the die of FIG. 4. In the Figure is shown extruder 201, die 202 and the introduction of means to introduce a coolant flow 303 into the interior of the extruded profile.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A method of making a profile by extruding a resin and fiber thermoplastic composite composition, to maintain a random fiber orientation, which method comprises:

(a) introducing a thermoplastic composite comprising a thermoplastic matrix and a randomly distributed fiber into an extruder equipped with an exit die having a desired profile shape;

(b) causing the resin and fiber to follow a flow path, from the extruder to the die, the path including a change in direction greater than 75° prior to exiting the exit die wherein the distance from the change in direction to the exit of the exit die is less than 10 centimeters to form a thermoplastic profile; and (c) cooling the interior of the profile with a coolant supplied by cooling means in the exit die.

2. The method of claim 1 wherein the resin comprises a polymer comprising repeating units formed from vinyl chloride.

3. The method of claim 1 wherein the fiber comprises a wood fiber having a minimum dimension of about 0.1 millimeters and an aspect ratio of greater than 1.5.

4. The method of claim 1 wherein the extruder is operated at a temperature greater than about 170° C.

5. The method of claim 1 wherein the exit die is operated at a temperature greater than about 175° C.

6. The method of claim 1 wherein the change in direction of the composite is between 85° and 95°.

7. The method of claim 1 wherein the extruder is a multistage extruder having a composite entry port, a first extruder section, a second extruder section and an exit section wherein the temperature of the entry port is greater than about 170° C., the temperature of the first and second extruder section is independently about 170° to 190° C. and the temperature of the exit port is greater than about 175° C.

8. The method of claim 1 wherein the extruder further comprises a pultrusion tractor to remove profile from the extruder.

9. The method of claim 1 wherein the extruder further comprises a vacuum block gauge to maintain accurate dimensions in the profile after it leaves the exit die.

10. The method of claim 1 wherein the profile exterior is cooled by fluid flow after leaving the exit die.

11. The method of claim 1 wherein the coolant comprises water.

12. The method of claim 1 wherein the coolant comprises air.

13. The method of claim 1 wherein the coolant comprises humidified air.

14. The method of claim 2 wherein the fiber comprises a wood fiber having a minimum dimension of about 0.1 millimeters and an aspect ratio of greater than 1.5.

* * * * *